United States Patent Office 3,346,533
Patented Oct. 10, 1967

3,346,533
RAPID CURING MIXTURE OF AN EPOXY RESIN, A DIPHENOL AND A DIAZIRIDENE COMPOUND
Greene W. Strother, Jr., Lake Jackson, Tex., assignor to The Dow Chemical Company, Midland, Mich., a corporation of Delaware
No Drawing. Filed Oct. 2, 1963, Ser. No. 313,153
11 Claims. (Cl. 260—32.8)

This invention relates to a thermosetting epoxy resin which may be cured in a relatively short time to produce a coating material having excellent physical properties as well as chemical and solvent resistance. More particularly the resin of this invention comprises the reaction product of a diepoxide compound, a diphenolic compound, and a diaziridine compound.

Epoxy resins are well known for the strong bonds which they produce with metal, glass, wood and other solids as well as for their toughness, resistance to solvents, electrical insulating properties, and the like. Some difficulty has been experienced in using these resins to produce protective coatings on surfaces owing to their slow rate of cure or setting. The rate may be accelerated by heating; however, this may not be practical on large extended surfaces and it may vaporize some of the more volatile reactants. In addition to heating, the rate of cure may be accelerated by the use of a more active curing agent or a higher concentration of the agent. Unfortunately, the resin frequently is extremely brittle when cured in this manner.

According to this invention, an epoxy resin having excellent solvent resistance and toughness is produced with a relatively short cure time. These resins which may contain a minor amount of a solvent can be air dried at ambient temperature for a period of time up to about one hour prior to curing at elevated temperature. The resin usually gels during this period so that successive coats may be applied to build up the film thickness without excessive sagging or run-off prior to the curing cycle.

This novel resin is obtained by reacting approximately equal molar ratios of a diepoxide compound, a diphenolic compound and a diaziridine compound. The following examples illustrate the method of producing the resin.

Example 1

Six parts by weight of bisphenol A were mixed with 10 parts of the diglycidyl ether of bisphenol A as the mixture was heated to aid in mixing these viscous materials. 5.7 parts of bis[2-(1-aziridinyl)ethyl] benzene dissolved in 5 parts acetone was added to the mixture. The resulting solution was spread on bonderized steel plates and allowed to stand at ambient temperature for one hour, then cured at 150° C. for 15 minutes. The cured film had the following properties:

Gardner impact:
  Front 28 in.-lbs.
  Back: 28 in.-lbs.
Mandrel bend: Passed ¼ in. diameter.

The film had excellent adhesion to the metal and appeared to be unaffected by intimate contact with water, acetone, toluene, and ethylene dichloride for 30 minutes at room temperature.

Example 2

25.7 parts by weight of bisphenol A were mixed with 50 parts of the diglycidyl ether adduct of adipic acid then 10 parts of this mixture were combined with one part of acetone and 3.3 parts of bis[2(1-aziridinyl)ethyl] benzene. The solution was spread on bonderized steel and allowed to stand at room temperature for 50 minutes, during which time the resin gelled. After curing the panel for 15 minutes at 150° C., the coating had the following properties:

Gardner impact:
  Front 28 in.-lbs.
  Back 28 in.-lbs.
Mandrel bend: Passed ¼ in. diameter.

As in the case of film prepared in Example 1, the film had excellent adhesion to the metal and was unaffected by the various solvents.

The results of tests of other films prepared in accordance with this invention are presented in Table I.

TABLE I

| Diepoxide Equiv. | Diphenol Equiv. | Aziridine Equiv. | Solids, Percent | Cure Time, min. | Film Thickness, mils | Gardner Impact, in.-lbs. Front | Gardner Impact, in.-lbs. Back | Mandrel Bend Diameter, inches | Solvent Resistance Water | Solvent Resistance Ethylene Dichloride | Solvent Resistance Toluene | Solvent Resistance Acetone |
|---|---|---|---|---|---|---|---|---|---|---|---|---|
| [1]1 | 1 | 1 | 92.5 | 40 | 0.5 | P28 | P28 | 1 | NE | NE | NE | SVS |
| 1 | [2]1 | 1 | 90 | 15 | 3 | P28 | P8 | ¼ | NE | NE | NE | NE |
| 1 | 1 | 1 | 81.5 | 30 | 1 | P28 | P28 | ¼ | NE | NE | NE | NE |
| 1 | 1 | 1 | 81.5 | 60 | 1 | P28 | P28 | ¼ | NE | NE | NE | NE |
| 1 | 0.75 | 0.75 | 82.5 | 15 | 1 | P28 | P28 | ¼ | NE | Soft | Soft | SS |
| 1 | 1.5 | 1.5 | 82.5 | 15 | 1 | P28 | P18 | ½ | NE | SVS | NE | SVS |

[1] Vinylcyclohexene dioxide.
[2] Resorcinol.
NE=No Effect.
Soft=Film easily scratched with fingernail and removed from metal plate.
SS=Scratches easily but not easily cut from metal plate.
SVS=Fingernail leaves only negligible scratch on film.

The diepoxide used in preparing the resins reported in Table I was the diglycidyl ether of bisphenol A except in the one resin where a different diepoxide is listed. The diphenol used was bisphenol A except where otherwise indicated. In all samples the aziridine employed was bis[2(1-aziridinyl)ethyl] benzene. The percent solids listed in the table is the total concentration of diepoxide, diphenol and diaziridine in acetone. All samples were dried in air at room temperature for one hour before curing at 150° C. for the designated period of time. Mandrel bend values are the minimum diameter rod around which the coated metal may be bent, i.e., through a 180° angle, without rupturing the film. The solvent resistance was determined after the coated panel had been immersed in the solvent at room temperature for 30 minutes, by scratching the film with the fingernail.

From the above data it can be seen that resins containing a diepoxide, a diphenol and a diaziridine in the approximate molar ratio of 1:1:1, respectively, are optimum. Some softening of the cured resin is observed when the ratio is as low as 1:0.75:0.75 and as high as 1:1.5:1.5.

Therefore, these ratios define the preferred range of compositions.

In general, any of the common diepoxides may be used in preparing resins according to this invention. Typical of these are diglycidyl ether, the diglycidyl ethers of bisphenols, diglycidyl ether adduct of adipic acid, vinyl cyclohexene and the diglycidyl ethers of polyhydric aliphatic alcohols. Any compound having at least two phenolic hydroxyl groups may be employed. Suitable diphenols include bisphenol A, bisphenol F, hydroquinone, resorcinol, and the like.

Diaziridine compounds, i.e., compounds containing two groups of the type

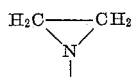

may be used in preparing these resins. In addition to the bis[2(1-aziridinyl)ethyl] benzene disclosed above, the resins may be produced from diaziridines defined generally by the following formula

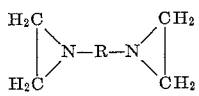

where R is an aromatic, substituted aromatic or aliphatic group containing up to about six carbon atoms.

The preferred solvents for the resin-producing mixture are the low molecular weight ketones such as acetone and methyl ethyl ketone. These ketones have good solvent properties and low boiling points so that low solvent concentrations may be used and the solvent easily removed. Less than about 20 weight percent solvent usually is adequate to prepare these solutions.

In addition to the diphenols and diepoxides disclosed above, it should be understood that they may contain nuclear substituted halogen to provide flame retarded resins. Examples of these substituted compounds are tetrabromobisphenol A and the diglycidyl ether of tetrabromobisphenol A.

For convenience the common names of various reactants have been used in the foregoing description of this invention. It should be understood that the term "bisphenols" includes compounds such as 4,4'-dihydroxy biphenyl, dihydroxyl diphenyl sulfone, bis(4-hydroxyphenyl) dimethylmethane, and bis(4-hydroxyphenyl) methane, the last two being commonly known as bisphenol A and bisphenol F, respectively.

The resin-producing mixture may be cured by heating to an elevated temperature in the range from about 100° C. to about 200° C. for a period of time between about 10 minutes and one hour, and preferably at about 150° C. for 15–30 minutes.

Although this invention has been described primarily with regard to the three reactants, it should be understood that any of the fillers commonly used with epoxy resins may be added. Typical fillers include silica flour, chopped glass fibers, asbestos, mica, etc.

I claim:

1. A thermosetting resin comprising a mixture of a diepoxide containing 1,2-epoxide groups, a diphenol and a diaziridine compound having the general formula

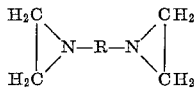

where R is selected from the class consisting of aromatic, substituted aromatic and aliphatic groups containing up to about six carbon atoms; said diepoxide, diphenol and diaziridine mixed in a molar ratio between about 1:0.75:0.75 and about 1:1.5:1.5, respectively.

2. A thermosetting resin according to claim 1 wherein said resin is dissolved in a low molecular weight ketone with the solution thereof comprising approximately 20 weight percent ketone.

3. A thermosetting resin according to claim 1 comprising a mixture of the diglycidyl ether of bis(4-hydroxyphenyl) dimethylmethane, bis(4-hydroxyphenyl) dimethylmethane and bis[2(1-aziridinyl)ethyl] benzene.

4. A thermosetting resin according to claim 3 wherein said diglycidyl ether of bis(4-hydroxyphenyl) dimethylmethane, bis(4-hydroxyphenyl) dimethylmethane and bis [2(1-aziridinyl)ethyl] benzene are present in approximately equal molecular ratios.

5. A thermosetting resin according to claim 3 wherein said resin is dissolved in acetone, the solution thereof comprising approximately 20 weight percent acetone.

6. A thermosetting resin comprising a diepoxide containing 1,2-epoxide groups, a diphenol and a diaziridine compound copolymerized in a molar ratio between about 1:0.75:0.75 and about 1:1.5:1.5, respectively, said diaziridine compound having the general formula

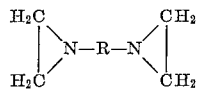

where R is selected from the class consisting of aromatic, substituted aromatic and aliphatic groups containing up to about six carbon atoms.

7. A thermoset resin characterized by good solvent resistance, high impact strength and rapid cure time comprising the reaction product of a diepoxide containing 1,2-epoxide groups, a diphenol and a diaziridine compound, said diaziridine compound having the general formula

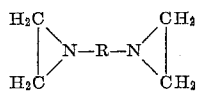

where R is selected from the class consisting of aromatic, substituted aromatic and aliphatic groups containing up to about six carbon atoms; said diepoxide, diphenol and diaziridine reacted in a molar ratio between about 1:0.75:0.75 and about 1:1.5:1.5, respectively.

8. A thermosetting resin comprising a mixture of a diepoxide containing 1,2-epoxide groups, a diphenol and bis[2-(1-aziridinyl)ethyl]benzene in a molar ratio between 1:0.75:0.75 and about 1:1.5:1.5, respectively.

9. A thermosetting resin according to claim 8 wherein said resin is dissolved in a low molecular weight ketone with the solution thereof comprising approximately 20 weight percent ketone.

10. A thermosetting resin according to claim 8 wherein the diepoxide is vinylcyclohexene dioxide.

11. A thermoset resin comprising essentially the reaction product of the composition of claim 8.

References Cited

UNITED STATES PATENTS

| | | | |
|---|---|---|---|
| 2,506,486 | 5/1950 | Bender et al. | 260—47 |
| 2,901,443 | 8/1959 | Stark et al. | 260—47 |
| 2,928,803 | 3/1960 | Belanger et al. | 260—47 |
| 3,079,367 | 2/1963 | Fram et al. | 260—47 |

WILLIAM H SHORT, *Primary Examiner.*

T. D. KERWIN, *Assistant Examiner.*